(12) United States Patent
Yokoyama

(10) Patent No.: US 6,547,400 B1
(45) Date of Patent: Apr. 15, 2003

(54) LIGHT SOURCE DEVICE, OPTICAL DEVICE, AND LIQUID-CRYSTAL DISPLAY DEVICE

(75) Inventor: Osamu Yokoyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/485,155
(22) PCT Filed: Jun. 4, 1999
(86) PCT No.: PCT/JP99/03012
§ 371 (c)(1), (2), (4) Date: Feb. 4, 2000
(87) PCT Pub. No.: WO99/63396
PCT Pub. Date: Dec. 9, 1999

(30) Foreign Application Priority Data

| Jun. 4, 1998 | (JP) | 10-155862 |
| Aug. 5, 1998 | (JP) | 10-221246 |
| May 14, 1999 | (JP) | 11-134770 |

(51) Int. Cl.$^7$ .......... G03B 21/28; G03B 21/00; G03B 21/26; G02F 1/1335; G09G 3/14
(52) U.S. Cl. .......... 353/98; 353/31; 353/37; 353/38; 353/94; 349/5; 349/7; 345/39; 345/46; 345/82; 345/83
(58) Field of Search .......... 353/31, 37, 38, 353/94, 98; 349/5, 7; 345/39, 46, 82, 83

(56) References Cited

U.S. PATENT DOCUMENTS

| 4,763,975 A | * | 8/1988 | Scifres et al. | 350/96.15 |
| 5,634,704 A | * | 6/1997 | Shikama et al. | 353/31 |
| 5,954,424 A | * | 9/1999 | Anderson et al. | 362/242 |
| 6,038,005 A | * | 3/2000 | Handschy et al. | 349/61 |
| 6,191,872 B1 | * | 2/2001 | DeCaro et al. | 358/509 |
| 6,227,669 B1 | * | 5/2001 | Tiao et al. | 353/31 |
| 6,236,382 B1 | * | 5/2001 | Kawakami et al. | 345/83 |
| 6,249,351 B1 | * | 6/2001 | de Groot | 356/512 |
| 6,330,111 B1 | * | 12/2001 | Myers | 359/599 |
| 6,386,720 B1 | * | 5/2002 | Mochizuki | 362/27 |

FOREIGN PATENT DOCUMENTS

| JP | 62-237485 | 4/1986 | G09F/9/00 |
| JP | 63-8703 | 1/1988 | G02B/6/00 |
| JP | 3-075737 | 8/1989 | G03B/21/14 |
| JP | 3-75737 | 3/1991 | G03B/21/14 |
| JP | 6-15006 | 1/1994 | A61M/39/02 |
| JP | 7-290760 | 4/1994 | B41J/2/44 |
| JP | 8-111107 | 10/1994 | F21V/8/00 |
| JP | 7-508105 | 9/1995 | G02F/1/1335 |
| JP | 9-073807 | 9/1995 | G02F/1/1335 |
| JP | 9-197401 | 1/1996 | G02F/1/1335 |
| JP | 8-111107 | 4/1996 | F21V/8/00 |
| JP | 8-290760 | 11/1996 | B41J/2/44 |
| JP | 9-73807 | 3/1997 | G02F/1/1335 |
| JP | 9-073807 | 3/1997 | F21V/8/00 |
| JP | 9-197401 | 7/1997 | |
| JP | 10-39301 | 2/1998 | G02F/1/1335 |
| JP | 10-039301 | 2/1998 | G02F/1/1335 |
| JP | 10-123512 | 5/1998 | G02F/1/1335 |

* cited by examiner

Primary Examiner—Alan A. Mathews
Assistant Examiner—Melissa Koval
(74) Attorney, Agent, or Firm—Oliff & Berridge, PLC

(57) ABSTRACT

A light source device, comprising a light guide block that is provided with an inner wall capable of reflecting light and is shaped as a hollow component to form a light guide, and a point light source array that is located opposite one end face of the light guide block and is capable of emitting light into the light guide.

44 Claims, 14 Drawing Sheets

100 LIGHT SOURCE DEVICE

LIGHT SOURCE DEVICE, OPTICAL DEVICE, AND LIQUID-CRYSTAL DISPLAY DEVICE

BACKGROUND OF THE INVENTION

1. Field of the Invention

The present invention relates to a projection-type liquid-crystal display device such as a light source device used in a projector, and particularly to a compact light source device suitable for use in a compact projector.

2. Description of the Related Art

In conventional practice, projectors in which images on liquid-crystal display elements are magnified, projected, and displayed are configured such that a single liquid-crystal display element is illuminated by a metal halide lamp from behind, and the image displayed by the liquid-crystal display element is magnified and projected by a projection lens.

For example, Japanese Unexamined Patent Applications (Kokai) 62-237485, 3-75737, and 8-111107 describe inventive structures in which a metal halide lamp or a halogen lamp are used as the light source, and light emitted by this light source is transmitted through a hollow light-guide structure and directed toward a liquid-crystal display element.

The above-described prior art, however, involves using a lamp as the light source, and is limited in the degree to which the size of the light source as such can be reduced. It is thus difficult to reduce the size of the projector as a whole. Portable communication terminal devices have appeared in recent years, dispensing with the need to project images to dimensions in excess of 60 inches with such projectors. It is proposed, for example, that the size of a projected image be reduced to about 10 or 20 inches. At this size of a projected image, a light-emitting element (light-emitting diode, semiconductor laser, etc.) or the like can be used as the light source, making it possible to design very small projectors.

Light-emitting elements and other miniature light-emitting devices are substantially point light sources, and it is therefore difficult to uniformly illuminate a liquid-crystal display element having a given surface area. An attempt to line up a plurality of light-emitting diodes and to illuminate a wide surface area ultimately yields an assembly of point light sources, resulting in a nonuniform distribution of light intensity in a two-dimensional plane.

Japanese Unexamined Patent Application 10-123512 discloses projector technology in which the light source is made up of a two-dimensional array of light-emitting diodes. Light from the light-emitting diodes is converted to planar light by microlens array (an array of lens elements formed in conformity with the light-emitting diodes) in order to allow light radiated by the light-emitting diodes (point light sources) to be directed toward liquid-crystal display elements in an efficient manner.

Such microlens arrays are disadvantageous, however, in that the lens action along the border between adjacent lens elements becomes weak as a result of manufacturing errors or the like, making it difficult to create uniform illumination light.

According to another arrangement, which is disclosed in Japanese Unexamined Patent Application 9-73807, the optical axis can be curved 90° to guide the light, but a technique has yet to be found that would allow the optical axis of a point light source to advance in a straight line, yielding planar light.

SUMMARY OF THE INVENTION

An object of the present invention, which was perfected in view of the above-described situation, is to provide a light source structure in which a plurality of point light sources are arranged in a planar configuration and which is suitable for miniaturization. Another object of the present invention is to provide a compact light source capable of displaying projected images having uniform light intensity by designing a structure capable of emitting uniform light through the use of a plurality of light-emitting diodes or other point light sources for illumination purposes.

The present invention resides in a light source device comprising light guide means that is provided with mutually opposite end faces and that has a light guide function whereby light entering through one end face is guided to and emitted from the other end face, and a point light source array that is a separate entity from the light guide means and that is obtained by arranging a plurality of point light sources in a planar configuration along one of the end faces of the light guide means.

The present invention also resides in a light source device comprising the following separate entities: a point light source array obtained by arranging a plurality of point light sources in a planar configuration, and light guide means in which light from the point light source array is admitted through at least one end, mixed, guided to the other end face, and emitted.

As a result of thoroughgoing research aimed at miniaturizing light sources and concerned with the relation between light guide means and planar point light source arrays, the inventor discovered that the stated object can be attained by providing a rectilinear or serial arrangement for the surface through which light is admitted into the light guide means and the surface through which the light admitted into the light guide means is allowed to escape in relation to the point light sources, and by the uniform dispersion of light received from the point light sources throughout the light guide body.

Based on the above discovery, the present invention has the following distinctive features.

The present invention is characterized in that the aforementioned point light sources are light-emitting elements that emit monochromatic light. Such light-emitting elements include light-emitting diodes (hereinafter "LEDs"), semiconductor lasers (LDs), and other point light sources, and are not limited in terms of emitted color. In other words, monochromatic elements (for example, white LEDs or light-emitting diodes that emit B (blue) light) may also be used.

When B (blue) light or other monochromatic light is used, wavelength conversion elements for converting this light to white light should preferably be disposed in the optical path.

The present invention is also characterized in that the aforementioned point light sources are light-emitting elements that differ in color, and the aforementioned point light source array is a combination of such light-emitting elements.

Such a combination of light-emitting elements may be a combination of three colors (RGB), a combination that includes colors other than these three colors (for example, orange and yellow green), or a combination of two, four, or more colors.

The present invention is further characterized in that the aforementioned light guide means is a hollow or solid light guide body, preferably composed of a transparent material. A first aspect of this light guide body is a hollow light guide block, which may be polygonal prismatic or cylindrical in shape. Reflecting metal surfaces may also be provided to the lateral surfaces (inner wall surfaces and inner peripheral surfaces) of the hollow light guide block.

A second aspect of the light guide body is a solid (rather than hollow) light guide block. Total reflection surfaces or reflecting metal surfaces may also be provided to the lateral surfaces of the solid light guide block. The light guide body may also be configured as a so-called Selfoc lens, which is obtained by forming a bundle from a plurality of optical fibers having a cladding and a core.

Another aspect of the present invention is an optical device comprising the aforementioned light source device and a member located opposite the end face for emitting the light of the light guide means and designed to modulate the light from the light guide means. Yet another aspect of the present invention is a liquid-crystal display device characterized in that this member is a liquid-crystal display element. According to this embodiment of the liquid-crystal display device, a magnifying lens is disposed in the optical path of the emitted light optically modulated by the aforementioned liquid-crystal display element. It is also possible to provide a screen configured such that the image of the liquid-crystal display element can be projected by the magnifying lens.

By allowing light emitted by the end face of the light source device thus configured to strike the liquid-crystal display element, it is possible for the image displayed by the liquid-crystal display element to be viewed directly, in magnified form, or in projected form.

A distinctive feature of the present invention is that light guide means is provided such that the illumination light from the light source device preferably propagates in a straight line without bending its optical axis and that the entire surface area (region) necessary for displaying images is uniformly illuminated in the process, making it possible to efficiently illuminate the illumination region (an image display region in the case of a liquid-crystal display device) while preventing light from being scattered outside the illumination region.

The present invention resides in a light source device comprising a light guide block provided with an inner wall capable of reflecting light, and shaped as a hollow component to form a light guide; and a point light source array in which point light sources capable of emitting light into the light guide are arranged opposite an end face of the light guide block.

In this structure, light emitted by point light sources located near the center of the point light source array is emitted by the other end face of the light guide without being reflected by the inner walls of the light guide block. Light emitted by point light sources located near the periphery of the point light source array is reflected by the inner walls of the light guide block and is emitted by the other end face. Light emitted by such point light sources along various routes is uniformly mixed inside the light guide. Adjusting the length of the light guide in the direction of the optical axis provides uniform light intensity across the light emission surface of the light guide.

In this case, the aforementioned point light sources may, for example, be light-emitting diodes. In addition, the aforementioned light guide block may, for example, have a polygonal prismatic shape whose inner walls are composed of a plurality of flat reflecting surfaces. The aforementioned light guide block may also have a cylindrical or elliptical shape whose inner walls are composed of curved surfaces.

In the present invention, the term "an end face of a hollow light guide block" refers to the surface that corresponds to an end face of a solid block equivalent to the aforementioned hollow block.

The present invention is also a liquid-crystal display device that is provided with the aforementioned light source device, wherein this liquid-crystal display device further comprises a liquid-crystal display element located opposite the other end face of the light guide block and configured to allow light emitted by a light guide to be modulated, so that images can be viewed directly from the light emission side of the liquid-crystal display element. This structure may, for example, be applied to liquid-crystal display devices used in portable information equipment.

The present invention is also a liquid-crystal display device that is provided with the light source device of the present invention, wherein this liquid-crystal display device further comprises a liquid-crystal display element disposed facing the other end face of the light guide block and configured such that light emitted by a light guide can be modulated, and a magnifying lens disposed in the optical path of the emitted light optically modulated by the liquid-crystal display element. This structure may, for example, be used in a head-mounted display in which the image on the liquid-crystal display element can be viewed directly through a lens.

The present invention may also comprise a screen configured such that the image on the aforementioned liquid-crystal display element can be projected by a magnifying lens. This structure may be used in projectors or the like.

The present invention is also a liquid-crystal display device equipped with the light source device of the present invention, wherein this liquid-crystal display device further comprises a dichroic prism or other color synthesis means which comprise, in accordance with each primary color, prescribed color modulation units comprising light source devices so configured as to be able to emit light within the wavelength region of each primary color, and liquid-crystal display elements that are disposed facing the other end face of the light guide means and that are configured such that light emitted by the light guide can be modulated, and in which light emitted by the prescribed color modulation units can be synthesized; and a projection lens disposed in the optical path of the emitted light synthesized by the color synthesis means.

The present invention is also a liquid-crystal display device equipped with the light source device of the present invention, wherein this liquid-crystal display device further comprises a dichroic prism which comprises, in accordance with each primary color, prescribed color modulation units comprising light source devices capable of emitting white light, liquid-crystal display elements that are disposed facing the other end face of the light guide means and that are configured such that light emitted by the light guide can be modulated, and filters so configured as to be able to transmit light within the wavelength region of each primary color, and in which light emitted by the prescribed color modulation units can be synthesized; and a projection lens disposed in the optical path of the emitted light synthesized by the dichroic prism.

The present invention is also a light source device comprising a flat light source array forming a planar configuration from a plurality of light-emitting elements for emitting light of the three primary colors, and a light guide body composed of a transparent material in which incident light from the flat light source array is guided to the emission side.

The present invention is also a light source device comprising a flat light source array obtained by forming a planar configuration from a plurality of light-emitting elements for emitting monochromatic light, and a light guide body composed of a transparent material in which incident light from the flat light source array is guided to the emission side; further comprising a luminescent film located opposite the light-receiving surface or light-emitting surface of the light guide body and designed to convert the monochromatic light to white light.

The light source device comprises a circuit for the simultaneous or sequential lighting of the light-emitting elements for emitting light of each color. Another distinctive feature is that the light-emitting elements are light-emitting diodes.

The present invention is a liquid-crystal display device, comprising the aforementioned light source device; a liquid-crystal display element located opposite the light-emitting surface of the aforementioned light guide body; and a projection lens located on the opposite side from the light guide body with respect to the liquid-crystal display element. According to another aspect of the liquid-crystal display device pertaining to the present invention, liquid-crystal display elements are synchronized with the sequential lighting of the aforementioned light-emitting diodes, and images are sequentially formed based on video signals separated by color. In this case, white light is preferred for the aforementioned light-emitting diodes. Mixing of white LEDs or color-emitting LEDs (RGB) can be suggested as an embodiment involving emission of white light. When monochromatic (for example, blue) light-emitting diodes are used, a luminescent film in which monochromatic light emitted by the aforementioned light-emitting diodes is converted to white light should be placed opposite the light-receiving surface or light-emitting surface of the aforementioned light guide body.

The aforementioned light-emitting diodes are light source devices composed of a plurality of colors based on the three primary colors and lighted simultaneously or sequentially, each producing white light. The formation of after images in the human eye is used when sequential lighting is employed.

According to another aspect of the liquid-crystal display device pertaining to the present invention, the aforementioned light-emitting diodes are composed of a plurality of colors based on the three primary colors, these diodes are sequentially lighted, the aforementioned liquid-crystal display elements are synchronized with the sequential lighting of the aforementioned light-emitting diodes, and images are sequentially formed based on video signals separated by color. High resolution can be obtained because images can be displayed for each color. In this case as well, color images can be obtained due to the existence of after images.

As referred herein, the term "light guide means" denotes a functional means for guiding light from a light source. An embodiment of such a light guide means is a light guide body serving as a member for realizing this light guiding function. An embodiment of such a light guide body is a light guide block. The light guide body may be a hollow or solid member. When the light guide body is a hollow component, the internal surfaces thereof should preferably be provided with reflecting metal films, which are means capable of total light reflection, as described above.

This light guide body is shaped and dimensioned to allow light to be uniformly mixed. In addition, the spacing pitch and other characteristics of the point light sources constituting the point light source array should be adjusted such that light can be uniformly mixed in the light guide body.

DESCRIPTION OF THE PREFERRED EMBODIMENTS

Preferred embodiments of the present invention will now be described with reference to drawings.

Embodiment 1

Figure 1:
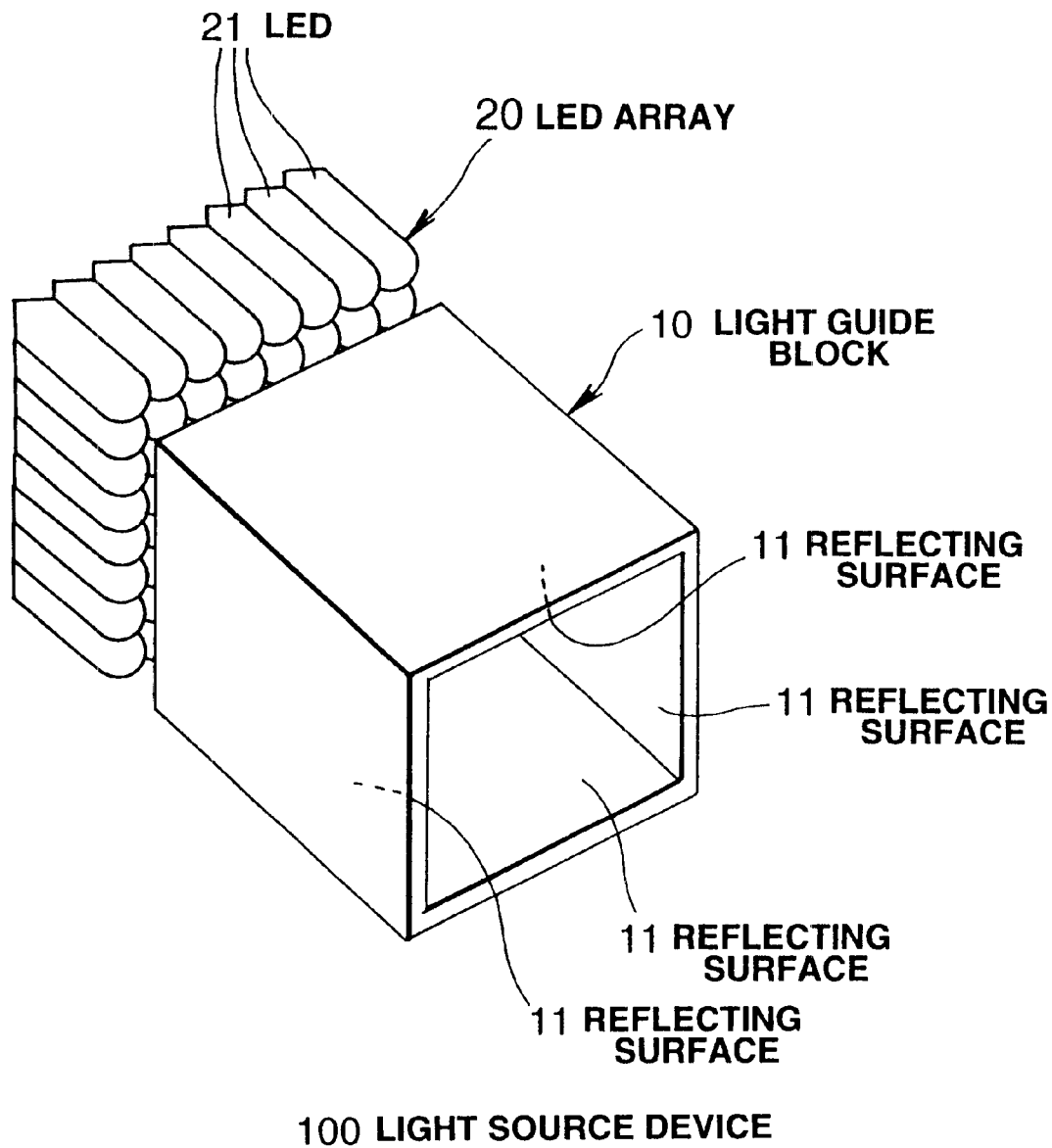
FIG. 1 is a perspective view of a light source device pertaining to embodiment 1.
Figure 2:
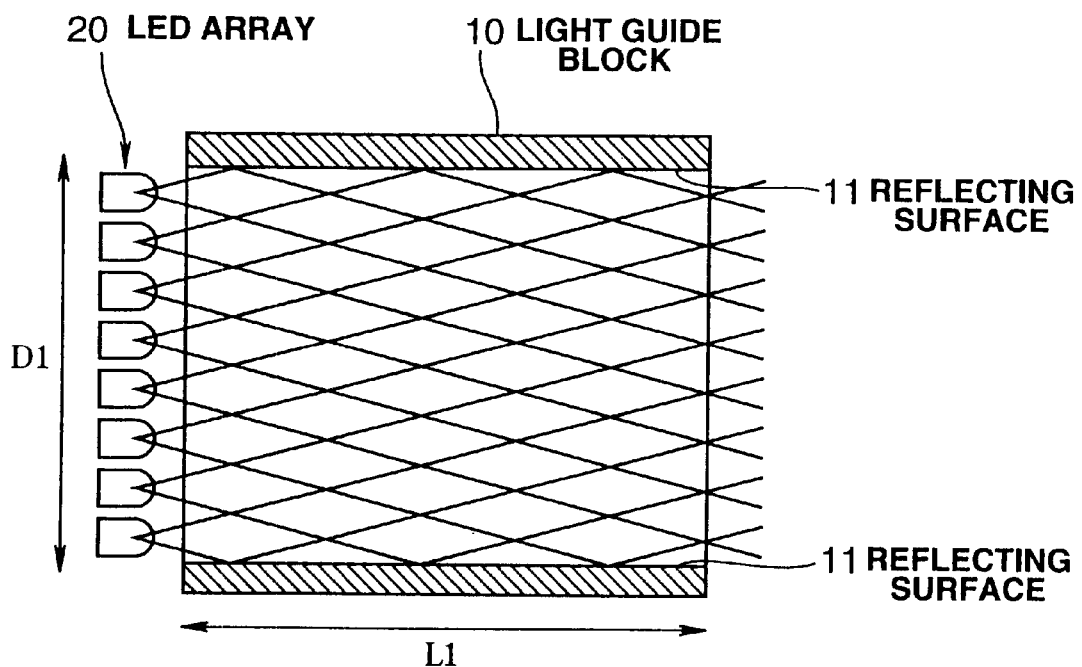
FIG. 2 is a cross section in the direction of the optical axis of the light source device according to embodiment 1 of the present invention.

Embodiment 1 of the present invention relates to a light source device. FIG. 1 depicts a perspective view of a light source device 100 according to the embodiment. FIG. 2 is a cross section obtained by cutting the light source device 100 along its optical axis. The light source device 100 comprises a light-guiding block 10 and an LED (light-emitting diode) array 20.

The light-guiding block 10 is a hollow prismatic structure formed from a plurality of (four) wall surfaces. The inner walls thereof form reflective surfaces 11 capable of reflecting light. The light-guiding block 10 may, for example, be obtained by bonding together four mirrors that have the same size as a wall surface and that are placed opposite each other. It is also possible to form the block by bonding four panels obtained by vapor depositing thin aluminum metal films or other films on resin panels or the like, or by laminating reflective films with an adhesive. In any type of construction, the inner walls of the light-guiding block 10 are finished to a smooth mirror surface such that light is totally reflected in order to reduce loss of light.

The LED array 20 is an entity which is separate from the light-guiding block and in which a plurality of light-emitting diodes (LEDs) 21 serving as point light sources are arranged in a planar configuration such as a two-dimensional cluster. The array should preferably be separated by an air layer from the block. The LEDs 21 are patterned such that the positive and negative lead wires of the LEDs are connected in parallel, and are fixed by soldering to a substrate provided with insertion holes in conformity with the arrangement of the LEDs. The LED array 20 is provided with a light-emitting surface whose area is substantially equal to the cross-sectional surface area of the light-guiding block 10 and which is arranged such that light emitted by the LEDs 21 is oriented in substantially the same direction. The light-emitting surface of the LED array 20 is located opposite one of the end faces of the light-guiding block 10. Selecting a placement that allows the light-emitting units of the LEDs to be housed in the light-guiding block 10 is preferred from the standpoint of preventing light loss. The LEDs 20 are configured such that they are able to emit light simultaneously by virtue of an outside power source (not shown). For example, an appropriate forward current of about 20 mA is passed in a controlled manner through the LEDs 21. The LEDs should preferably emit white light, particularly in a color display.

It is also possible to arrange LEDs that emit monochromatic light of three primary colors (red, green, and blue) according to a prescribed pattern and to energize all these LEDs, creating white planar light. This arrangement has the following advantages. Specifically, using white LEDs produces a structure in which, for example, light from the LEDs undergoes color conversion by means of a phosphor, in which case the outside dimensions of a single white LED are considerable because they include the phosphor portion.

By contrast, the outside dimensions of an LED emitting primary color light (red, blue, or green) can be limited to the size of a light-emitting chip, allowing more such LEDs to be accommodated per unit of surface area than when white LEDs are used. It is therefore possible to obtain white planar light of higher intensity when LEDs emitting primary color light (red, blue, or green) are provided, and all these LEDs are energized to obtain a white color. A monochromatic light source device can be constructed if LEDs emitting monochromatic light (red, green, or blue) instead of a white color are used separately. This monochromatic light source device can be used to emit primary color light for a color display device.

Although resin-molded LEDs having convex lens structures at their tips were used as the point light sources in the above-described arrangement, it is also possible to use LEDs provided with planar resin packages or LED chips not covered in a resin mold. Elements operating on other light emission principles, such as semiconductor laser elements, may also be used as long as these elements are point light sources that emit light and have low power consumption.

Figure 3:
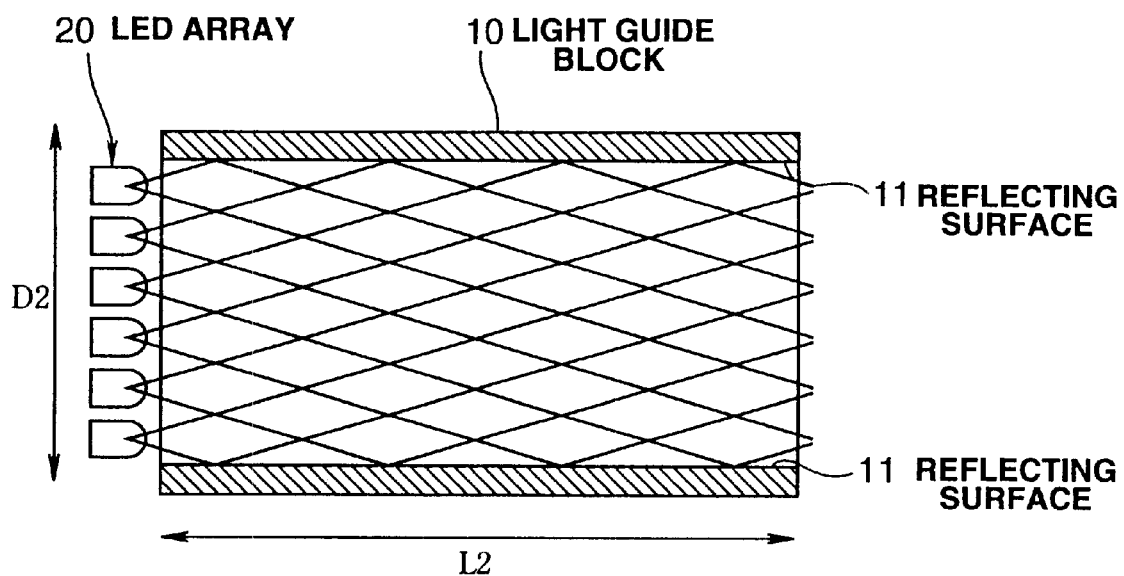
FIG. 3 is a cross section in the direction of the optical axis of the light source device according to a modification of embodiment 1 of the present invention.

In the light source device configured as shown in FIG. 1 above, light from the LED array 20 is uniformly mixed while reflected from the inner wall surfaces (reflecting surfaces 11) in the light-guiding block 10, and is emitted by the end face opposite the side on which the LED array 20 is provided, as shown in FIGS. 2 and 3.

The light source device used in this case should be configured to satisfy the relation $L \square P/(\tan \theta)$ in order to uniformly mix the light from the LED array 20 in the light-guiding block 10 and to emit planar light of uniform intensity. In the above formula, $L(=L_1)$ is the length of the light guide in the light-guiding block 10 depicted in FIG. 2, P is the interval between adjacent LEDs in the LED array, and $\theta$ is the angle with the optical axis at a position in which the intensity of light radiated by the LEDs is half the intensity of light from the LEDs along the optical axis. Such an arrangement allows light emitted by adjacent LEDs to be added up, yielding a more uniform intensity distribution. If the length L of the light guide is less than $P/(\tan \theta)$, there is a possibility that low-intensity areas will form between adjacent LEDs and that the intensity distribution will become nonuniform.

Another feature is that the inner size D1 (cross-sectional surface area) and total length L1 of the light-guiding block 10 in FIG. 2 can be appropriately varied according to design. The inner size D1, that is, the length/breadth of the space between the inner walls, is established in accordance with the external shape of the liquid-crystal display elements used in conjunction with the light source device. The inner size is so selected as to allow light to be shone on all the pixels of the liquid-crystal display elements. The number and arrangement of LEDs 21 are selected in a manner that allows the LED array 20 to direct light without any gaps through the area defined by the inner size of the light-guiding block 10. The total length L1 of the light-guiding block 10 is set to a level at which light of adequate uniform intensity is emitted from the output end face as a result of the fact that the light from the point light sources is dispersed by being reflected from the reflective surfaces 11. Assuming, for example, that the inner size D1 of the light-guiding block 10 corresponds to a breadth of 24 mm and a length of 18 mm, the LED array 20 would be composed of a total of 48 LEDs 21 (diameter: 3 mm) arranged in eight rows in the crosswise direction and six rows in the lengthwise direction. The total length L1 of the light-guiding block 10 is about 30 mm. A smaller inner size D2 and a greater total length L2 should be selected if it is required that the inner size D1 be further reduced and the light guide be extended to obtain light of uniform intensity, as shown in FIG. 3.

In the above-described structure, light emitted by the LEDs 21 in the area near the center of the LED array 20 escapes through the other end face of the light guide without being reflected from the reflective surfaces 11, as shown in FIG. 2. Light emitted by the LEDs 21 in the area near the periphery of the LED array 20, on the other hand, escapes through the other end face after being reflected from the reflective surfaces 11. Light emitted by the LEDs 21 is mixed in the light-guiding block 10 in this manner. Adequately adjusting the length L1 of the light-guiding block 10 in the direction of the optical axis allows light of uniform intensity to be emitted by the light emitting surface of the light-guiding block 10. This uniform intensity light is suitable as light impinging on the liquid-crystal display elements used in projectors and head-mounted displays.

The above-described light source device of embodiment 1 is suitable as a light source for projectors, head-mounted displays, and various other liquid-crystal display devices because light from LEDs (point light sources) is appropriately mixed while transmitted through the light-guiding block, the intensity of light is rendered uniform, and uniform planar light is emitted.

This device can also be used for illuminating portable display devices because the LEDs and other point light sources are small and lightweight, have low power consumption, and can thus be energized by batteries and other portable power sources.

This device can also be fabricated easily and inexpensively because the simple structure of the light-guiding block can be obtained by the bonding of mirror surfaces.

Embodiment 2

Figure 4:
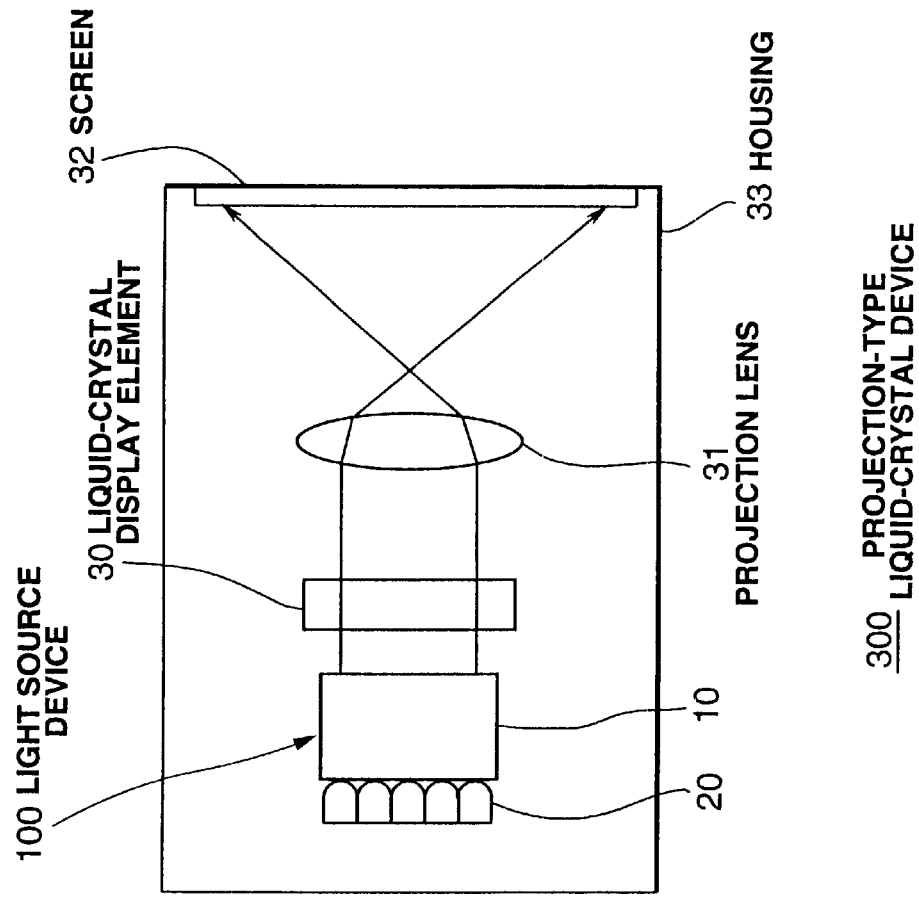
FIG. 4 is a block diagram of an optical system for the projection-type liquid-crystal display device according to embodiment 2.

Embodiment 2 of the present invention relates to a miniature projection-type liquid-crystal display device in which the light source device described with reference to embodiment 1 can be used. FIG. 4 is a block diagram of the optical system for the projection-type liquid-crystal display device 300 of the present embodiment.

The projection-type liquid-crystal display device 300 comprises a light source device 100, a liquid-crystal display element 30, a projection lens 31, and a screen 32 in a housing 33, as shown in FIG. 4. The light source device 100 is the same as that used in embodiment 1 above. The light source device 100 emits white light. The liquid-crystal display element 30 is so configured as to allow passage or blockage of light in individual pixels to be controlled in accordance with a drive signal (not shown). Specifically, the liquid-crystal display element 30 receives light emitted by the light source device 100 and is capable of modulating light and outputting it as images in accordance with the logic state of the drive signal. In more specific terms, the arrangement or direction of the ordered liquid-crystal molecules in the liquid-crystal display element is varied by the electric field or heat, the optical characteristics of the liquid-crystal layer are changed, and light passage/blockage is controlled. Various known structures may be used. In addition, the liquid-crystal display element 30 is provided with color filters, and its color pixels are composed of a plurality of pixels corresponding to primary colors. Color display can be achieved by allowing or blocking passage of primary color light.

The projection lens 31 is so designed as to allow an image optically modulated by the liquid-crystal display element 30 to be formed on the screen 32. The screen 32 is semitransparent and is configured to allow scattered reflection of light, making it possible to view the displayed image from the opposite side of the projection lens 31.

When the present invention is adapted to a head-mounted display, viewfinder, or other liquid-crystal display device, the liquid-crystal display element is placed closer to the projection lens than the front focal distance, making it possible to view a magnified image on the liquid-crystal display element through the projection lens.

When the present invention is adapted to a direct-view liquid-crystal display device used in personal computers or portable electronic terminals, the projection lens or screen is dispensed with, and the liquid-crystal display element can be viewed directly.

In the above-described structure, white light of uniform intensity is emitted by the light source device 100, and light (including color) modulation is performed by the liquid-crystal display element 30. Although it can be viewed directly, the optically modulated image is further refracted by the projection lens 31 for magnification and display. The optically modulated image is magnified and displayed on the screen 32 at a magnification determined by the distance between the projection lens 31 and the screen 32.

Figure 5:
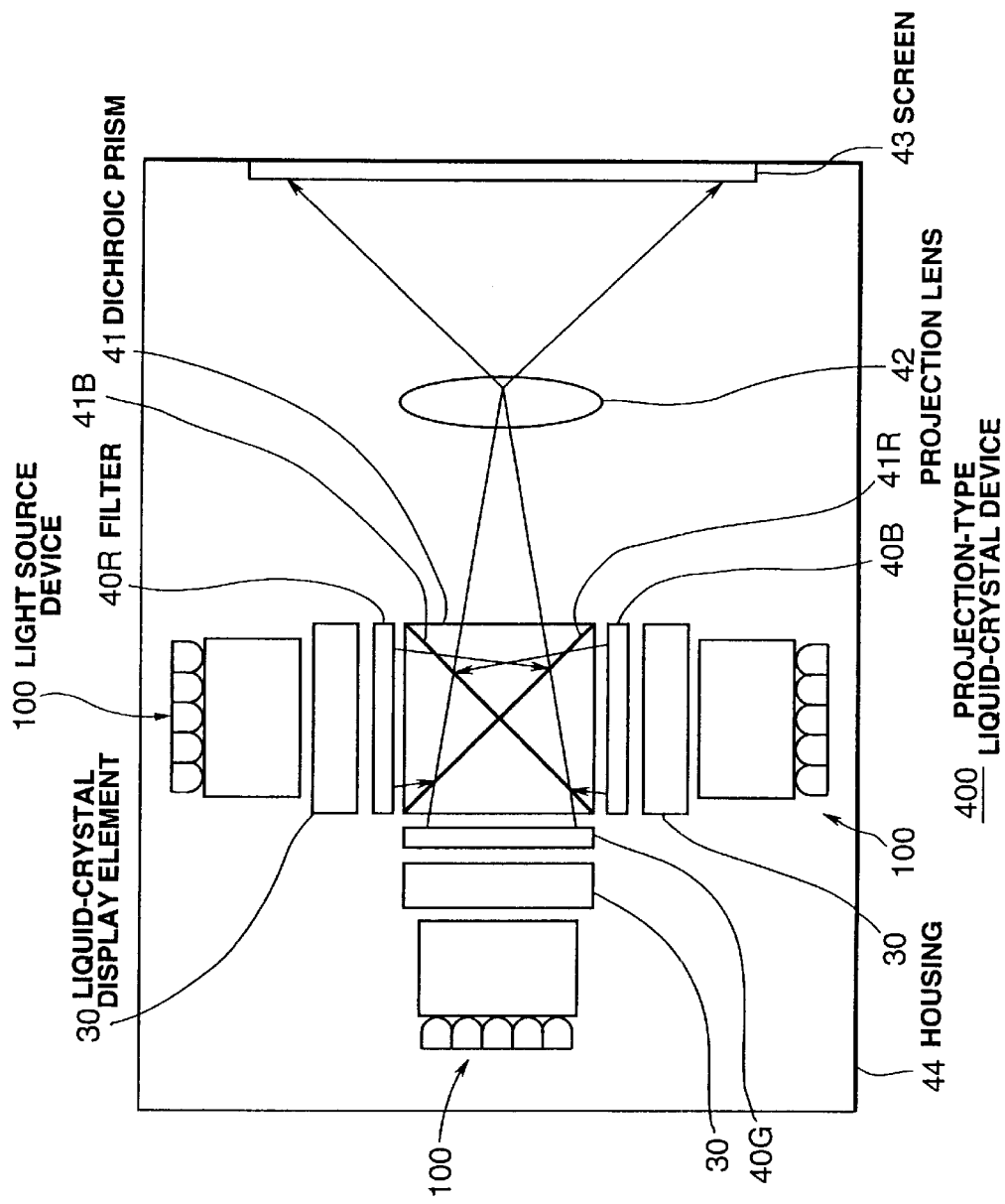
FIG. 5 is a block diagram of the optical system for a projection-type liquid-crystal display device according to embodiment 2.

When higher luminous intensity is required in order to increase the magnification of the projected image, it is also possible to configure the projection-type liquid-crystal display device in a manner such that liquid-crystal display elements are provided for each primary color, as shown in FIG. 5. The projection-type liquid-crystal display device 400 in FIG. 5 comprises a light source device 100 and a filter 40 for each primary color, as well as a dichroic prism 41, a projection lens 42, a screen 43, and a housing 44. The filters 40(R, G, B) convert white light from the light source device 100 to light of primary colors. The filters 40(R, G, B) may be disposed between the light source device 100 and the liquid-crystal display element 30. The filters 40 can be dispensed with if the LEDs 21, which determine the color of light emitted by the light source device 100, are composed of elements for emitting light of primary colors. LEDs that emit light of primary colors than the combination of filters with white LEDs are expected to produce higher luminous intensity of emission. The dichroic prism 41 comprises a multilayer film 41R capable of reflecting solely the red color, and a multilayer film 41B capable of reflecting solely the blue color. The prism is configured such that optically modulated images for each primary color are synthesized, directed toward the projection lens 42, and emitted. The projection lens and screen are the same as in embodiment 1. This projection-type liquid-crystal display device is expected to produce bright images.

Modification

The present invention is not limited by the above-described embodiments and can be modified and used in a variety of ways. For example, the light-guiding block in the light source device is not limited to the above-described prismatic cross-sectional shape and may be shaped differently to conform to the outer shape of the display region of the liquid-crystal display element, such as triangular prismatic, pentagonal prismatic, or other polygonal prismatic. It is also possible to construct the inner walls with curved surfaces, yielding a cylindrical shape that is circular or elliptical in cross section. In addition, the hollow structure constituting the light guide may be a cavity or may be packed with a transparent material.

Point light sources other than the above-described LEDs may be used for the point light source array. The shape of the array is not limited to the above-described planar two-dimensional arrangement and includes two-tier structures in which light emitted by the lower layer is unlikely to be blocked by the LEDs in the upper layer. In other words, the point light source array can have any shape as long as the projection shape of the point light source array is a plane substantially equal to the end face of the light-guiding block facing this array.

Embodiment 3

Figure 6:
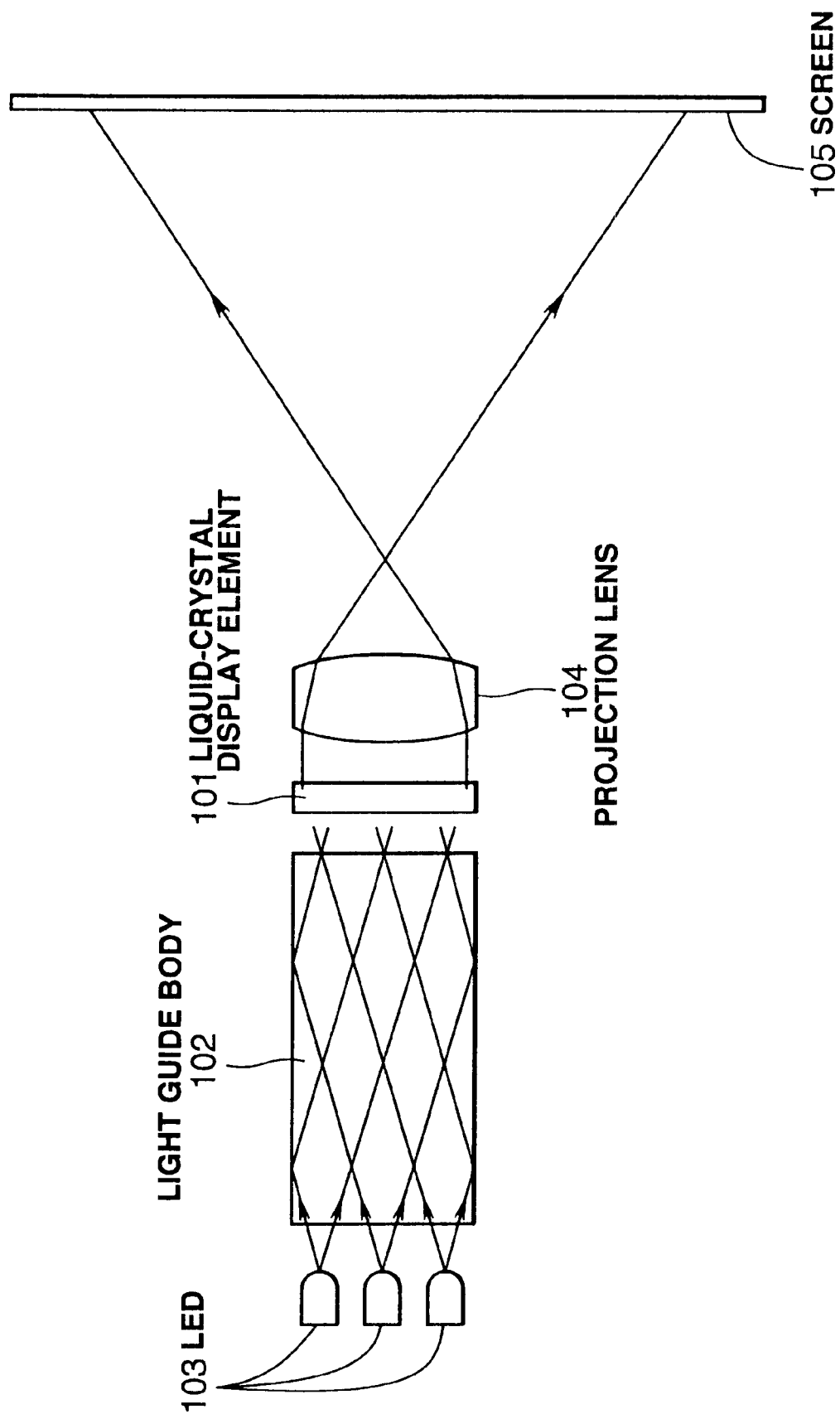
FIG. 6 is a top view of the main optical system for a light source device and projection-type liquid-crystal display device according to embodiment 3.
Figure 7:
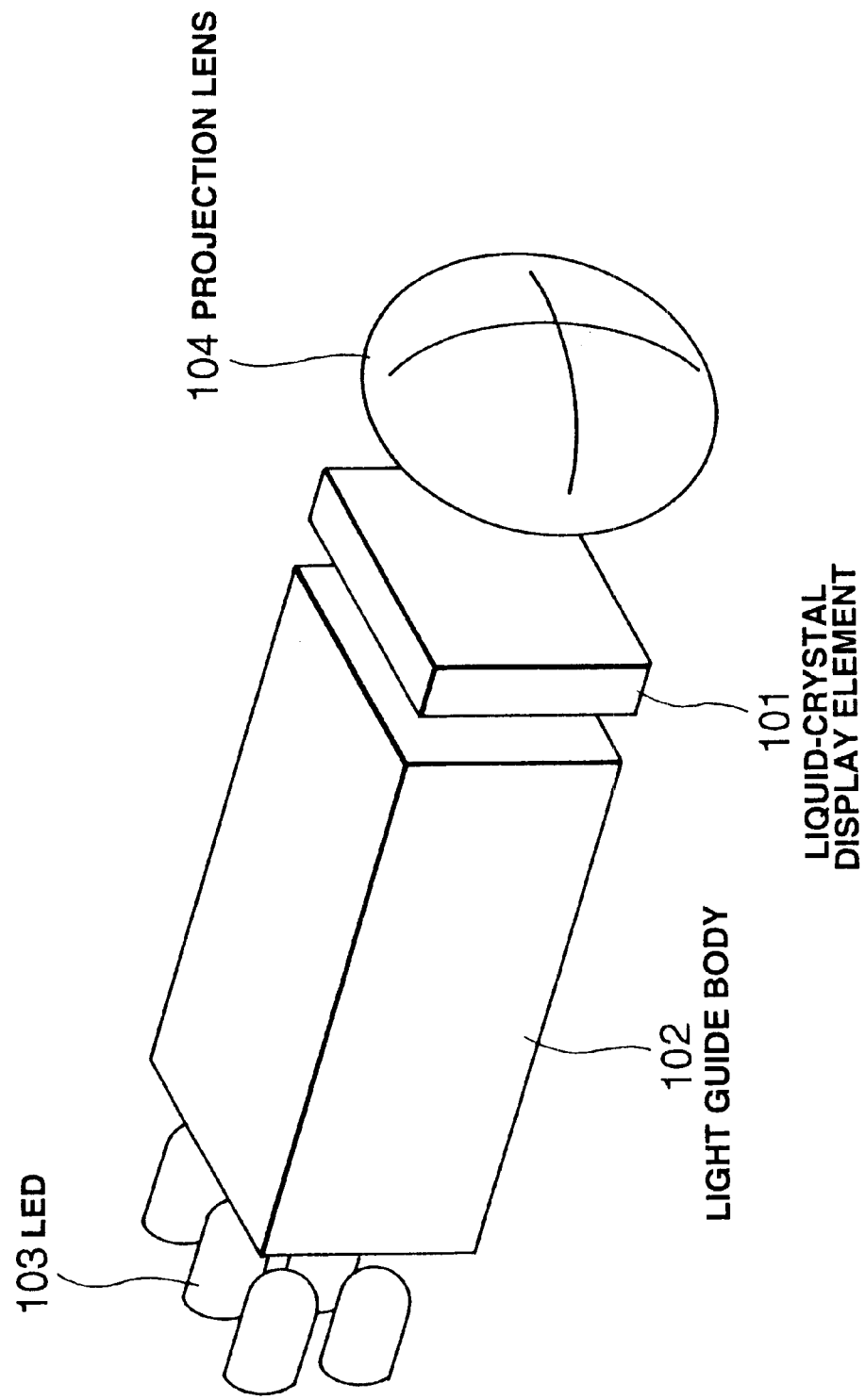
FIG. 7 is a perspective view of the main optical system for the light source device and projection-type liquid-crystal display device according to embodiment 3.

Embodiment 3 of the present invention will be described with reference to FIGS. 6 and 7.

Light-emitting diodes (LEDs) 103 serving as point light sources are arranged in a planar arrangement, that is, in two dimensions, facing an end face (light-receiving end face) of a light guide body 102 (an acrylic resin square bar). The diodes form a separate entity from this light guide body 102. A liquid-crystal display element 101 is disposed facing the other end face (light-emitting end face) of the light guide body 102. Light emitted by the light-emitting end face of the light guide body 102 strikes the liquid-crystal display element 101. The image displayed by the liquid-crystal display element 101 is magnified by a projection lens 104 and is projected onto a screen 105.

The display region of the liquid-crystal display element 101 measures, for example, 10.2 mm×7.6 mm (0.5 inch diagonally), has a color filter for each pixel, and is capable of color display.

In the light guide body 102, the end face opposite the overlying and underlying liquid-crystal display element 101 and LEDs 103 measures 12 mm×8 mm, and is 50 mm long. Although the external dimensions of the end face of the light guide body may be the same as those of the display region of the liquid-crystal display element 101 (10.2 mm×7.6 mm), in the present embodiment these dimensions are somewhat greater than those of the display region. Light propagating through the light guide body undergoes repeated total reflection from the sides of the light guide body 102, and these sides are made into mirror surfaces or total reflection surfaces in order to reduce loss of light due to scattering.

A transparent resin, glass, or the like may be used in addition to acrylic as the material for the light guide body 102.

LEDs 103 emit white light. LEDs 103 may, for example, be constructed by coating light-emitting elements with resin and shaping their tips as lenses. The diameter, of LEDs 103 is 3 mm, and six LEDs are arranged in a two-dimensional 3×2 configuration opposite the light-receiving end face of the light guide body 102.

Light emitted by the LEDs is mixed while transmitted through the light guide body 102, yielding a uniform intensity distribution and uniformly illuminating the display region of the liquid-crystal display element 101. The length of the light guide body 102 must be optimized depending on the size of the display region, the number and arrangement period of the LEDs 103, or the directionality of radiated light due to the shape of the tip lens.

The relation $L \square P/(\tan \theta)$ should preferably be satisfied in order to uniformly mix light in the light guide body 102 and to emit planar light having a uniform intensity distribution. In the above formula, L is the length of the light guide in the light guide body 102, P is the interval between adjacent LEDs 103, and $\theta$ is the angle with the optical axis at a position in which the intensity of light radiated by the LEDs is half the intensity of light in the intensity distribution along the optical axis. Such an arrangement allows light emitted by adjacent LEDs to be added up, yielding a more uniform intensity distribution. If the length L of the light guide is less than $P/(\tan \theta)$, there is a possibility that low-intensity areas will form between adjacent LEDs and that the intensity distribution will become nonuniform.

The array of LEDs 103 is separated from the light guide body 102, preferably set off from the light guide body 102 by an air layer. In such a structure, light is totally reflected from the inner walls of side sections inside the light guide body, mixed, and made into a more uniform intensity distribution as a result of the fact that the inner walls of side sections other than the light-emitting face of the light guide body are polished or otherwise treated. It is also possible to use a solid light guide body 102 or to provide the end faces of side sections with a thin metal film or other reflecting film.

The projection lens 104 comprises a plurality of lenses and has a diameter of 30 mm, for example. The image on the liquid-crystal display element 101 (whose display region has a diagonal size of 0.5 inch) is magnified to a diagonal size of 7 inches and projected onto the screen 105.

To display video images or TV images on the liquid-crystal display element 101, it is possible to use a known circuit as the display circuit (not shown) connected to the liquid-crystal display element, and to display the images at a DC voltage of about 5 V. It is also possible to use a battery as the power source of the liquid-crystal display element pertaining to the present embodiment (embodiment 3) because the LEDs 103 can emit light at a DC voltage of about 3 V. It is thus possible to make the entire device much smaller than a conventional projection-type liquid-crystal display device in which a metal halide lamp or the like is used as the light source.

Although the present embodiment (embodiment 3) was described with reference to a display device in which a liquid-crystal display device featuring color filters was illuminated with white LEDs, it is also possible to use an arrangement in which monochromatic images (obtained by illuminating a liquid-crystal display element devoid of a color filter with LEDs emitting monochromatic light such as green light) are mixed or projected onto a single screen on a time-sharing basis to produce a color image.

Although the light-emitting portions of the LEDs 103 used were provided with lens-shaped structures, it is also possible to use LEDs whose light-emitting portions have flat end faces. In this case, the length of the light guide body 102 must be optimized in order to obtain a uniform distribution of front light in the liquid-crystal display element.

Although the light source device in the present embodiment (embodiment 3) was described with reference to a light source obtained by arranging a plurality of LEDs, it is also possible to use a structure in which a single LED is used, and the light emitted by the LED is directed toward the liquid-crystal display element while the intensity distribution of this light is rendered substantially uniform by a light guide body.

When a support member for supporting and fixing the light guide body 102 on the liquid-crystal display device comes into contact with the side surface of the light guide body 102, light is scattered or absorbed in this portion, reducing the luminous energy reaching the liquid-crystal display element. Consequently, returning light to the light guide body by vapor-depositing a thin metal film on the surface portion of the light guide body in contact with the support member or by bonding a reflecting member resembling a mirror surface to this surface portion is effective for preventing a reduction in the utilization efficiency of light.

Embodiment 4

Embodiment 4 of the present invention will now be described. In embodiment 4, the same components as those in the above-described structure of embodiment 3 are assigned the same symbols, and their structure is omitted from the description.

Figure 8:
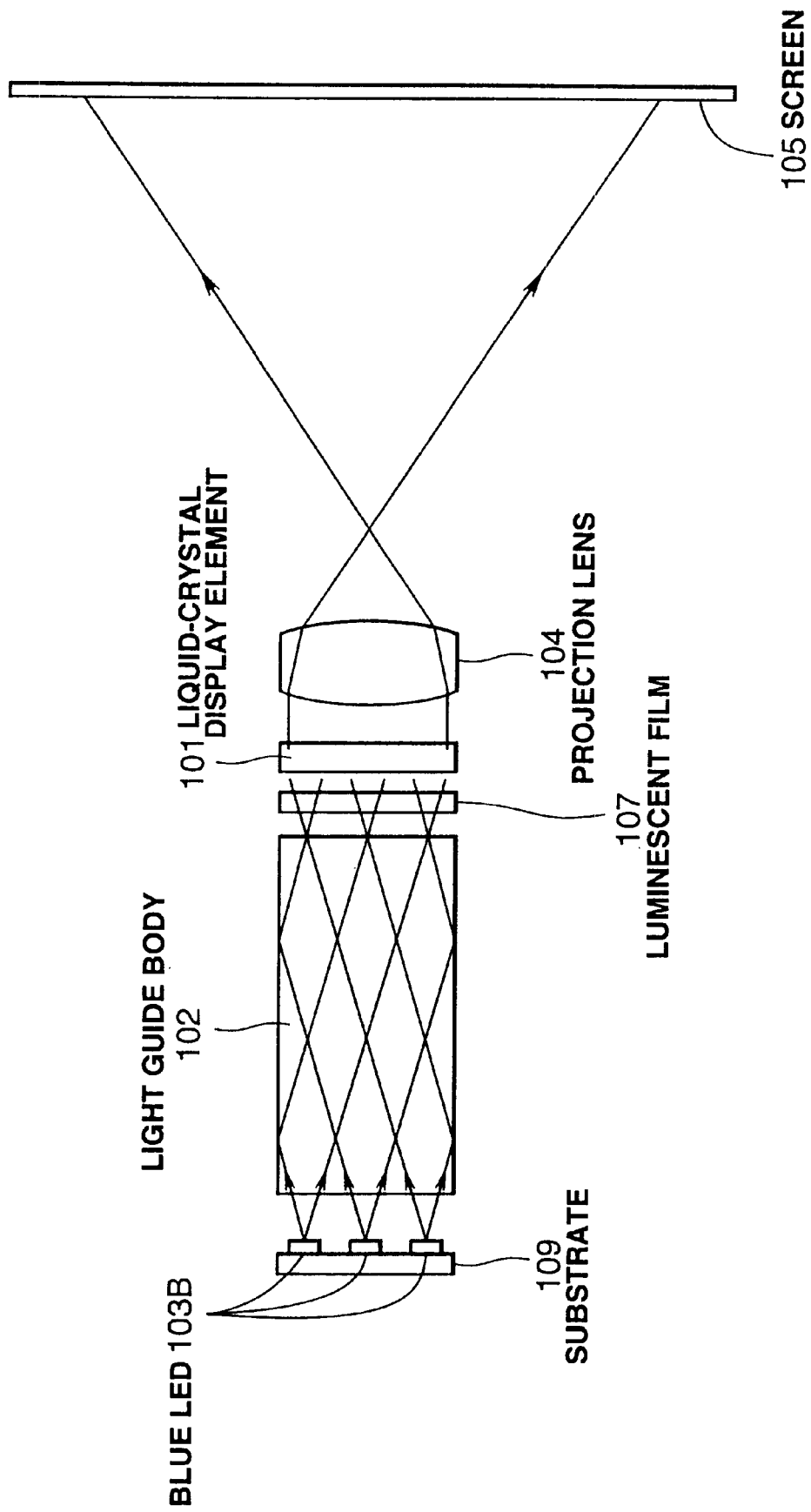
FIG. 8 is a top view of the main optical system for a light source device and projection-type liquid-crystal display device according to embodiment 4.
Figure 9:
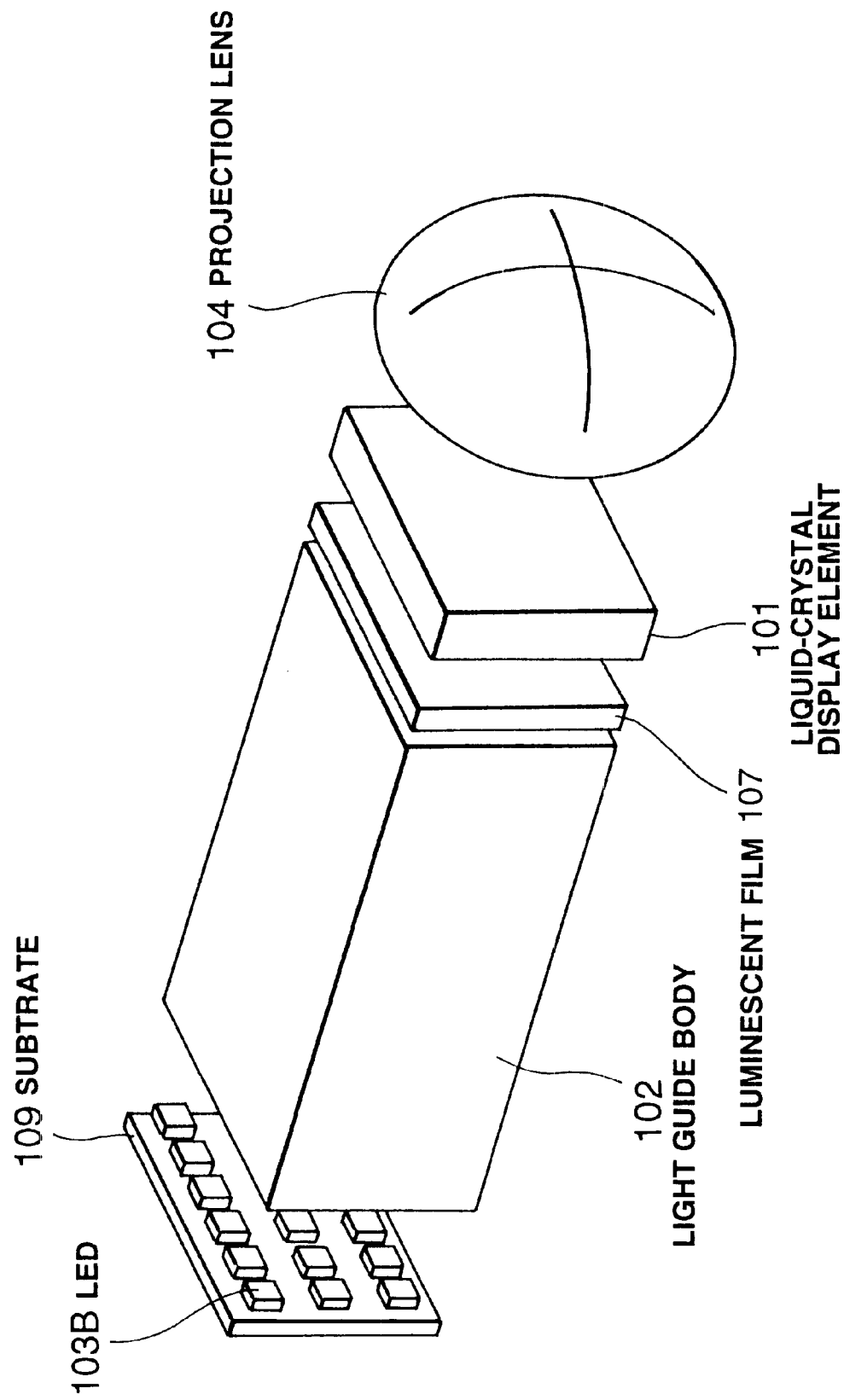
FIG. 9 is a perspective view of the main optical system for the light source device and projection-type liquid-crystal display device according to embodiment 4.

As depicted in FIGS. 8 and 9, a distinctive feature of embodiment 4 is that, for example, LEDs 103B emitting blue light are used as the light-emitting diodes (LEDs) 103.

Figure 10:
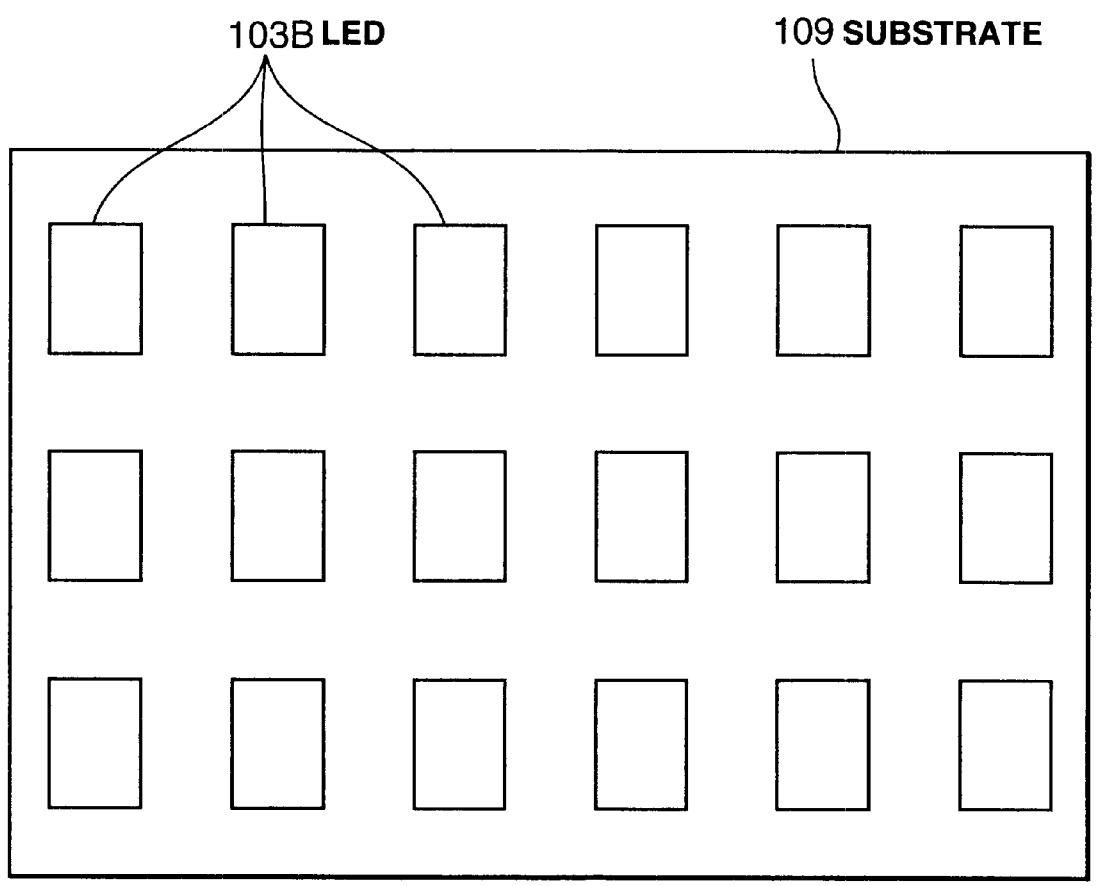
FIG. 10 is a plan view of a light source unit according to embodiment 4.

The LEDs 103B are arranged in two dimensions within a plane, forming a 3×6 matrix on a substrate 109, as shown in FIG. 10. The intervals between the horizontal and vertical rows of LEDs may, for example, be 2.5 mm and 2 mm, respectively. This arrangement is not limiting, however.

In addition, a luminescent film 107 is disposed on the emission surface side of the light guide body 102. The luminescent film 107 is excited by blue light and is caused to change color. In the present embodiment (embodiment 4), a red phosphor and a green phosphor are used as such phosphors, and these generate white light that contains the blue light passing through the luminescent film 107.

Such a light source device can also be provided with liquid-crystal display element 101, a projection lens 104, and a screen 105 downstream of the luminescent film 107, yielding a liquid-crystal display device.

In this case, the following advantages are obtained. Specifically, using white LEDs produces a structure in which, for example, light from blue LEDs undergoes color conversion by means of a phosphor, in which case the outside dimensions of a single white LED are considerable because they include the phosphor portion. By contrast, the outside dimensions of an LED emitting blue light can be limited to the size of a light-emitting chip, allowing more such LEDs to be accommodated per unit of surface area than when white LEDs are used. It is therefore possible to obtain more-intense white light when color conversion is performed by employing blue LEDs alone and increasing the energy of emitted light.

Embodiment 5

Embodiment 5 of the present invention will now be described. In embodiment 5, the same components as those in the above-described structure of embodiment 3 are assigned the same symbols, and their structure is omitted from the description.

Figure 11:
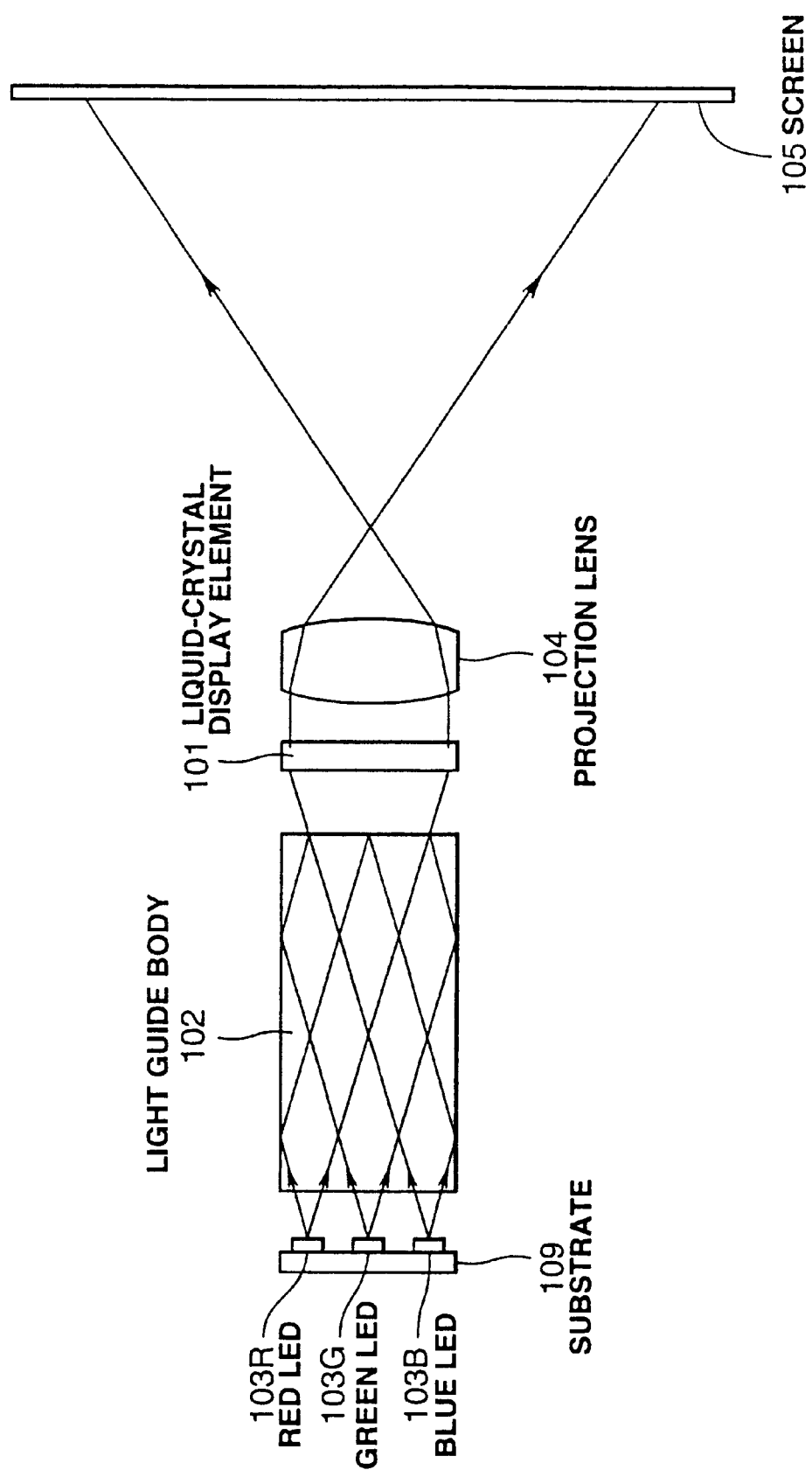
FIG. 11 is a top view of the main optical system for a light source device and projection-type liquid-crystal display device according to embodiment 5.
Figure 12:
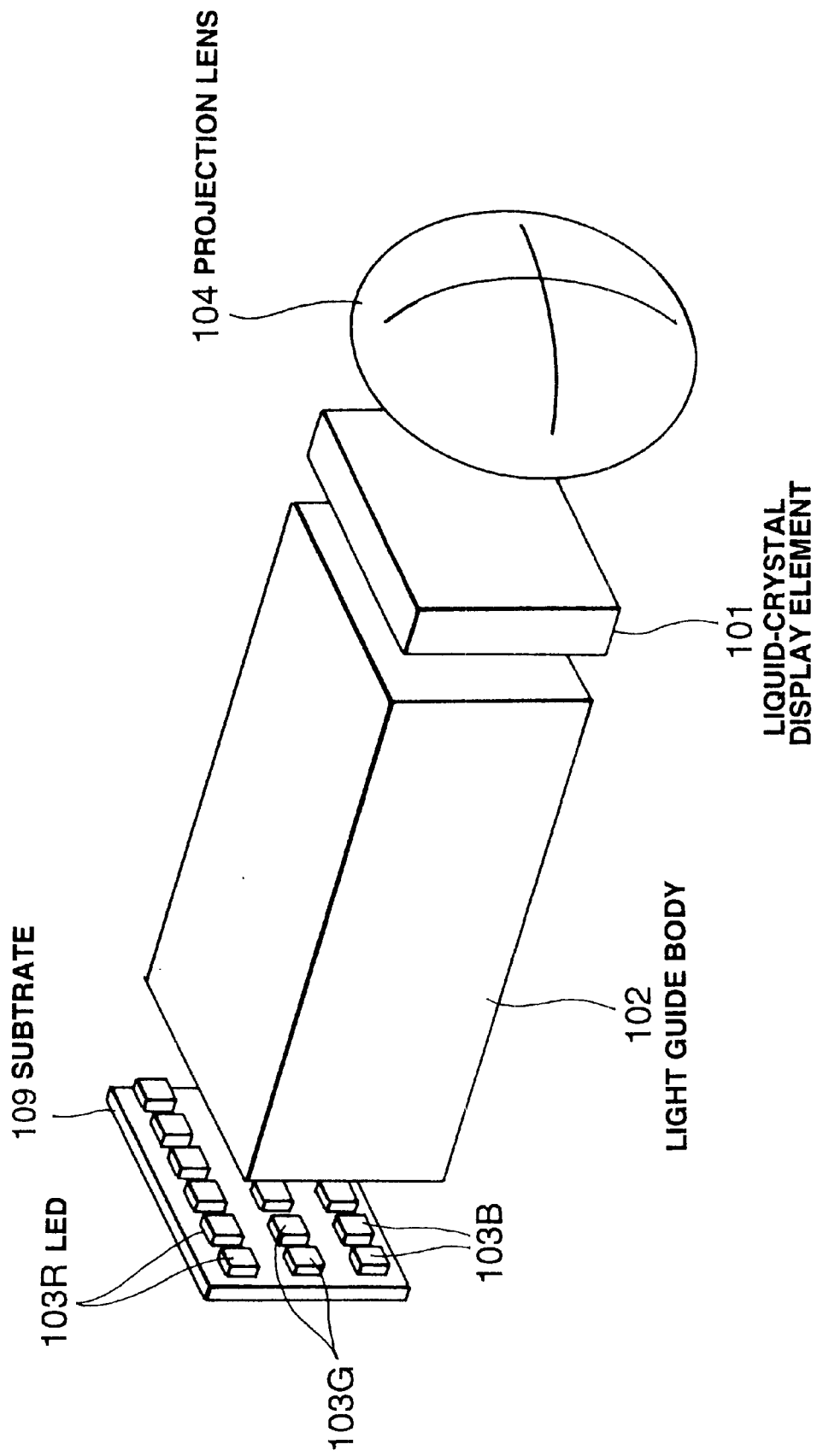
FIG. 12 is a perspective view of the main optical system for the light source device and projection-type liquid-crystal display device according to embodiment 5.

As depicted in FIGS. 11 and 12, a distinctive feature of embodiment 5 is that LEDs 103R, 103G, and 103B emitting RGB light are used as the light-emitting diodes (LEDs) 103.

Figure 13:
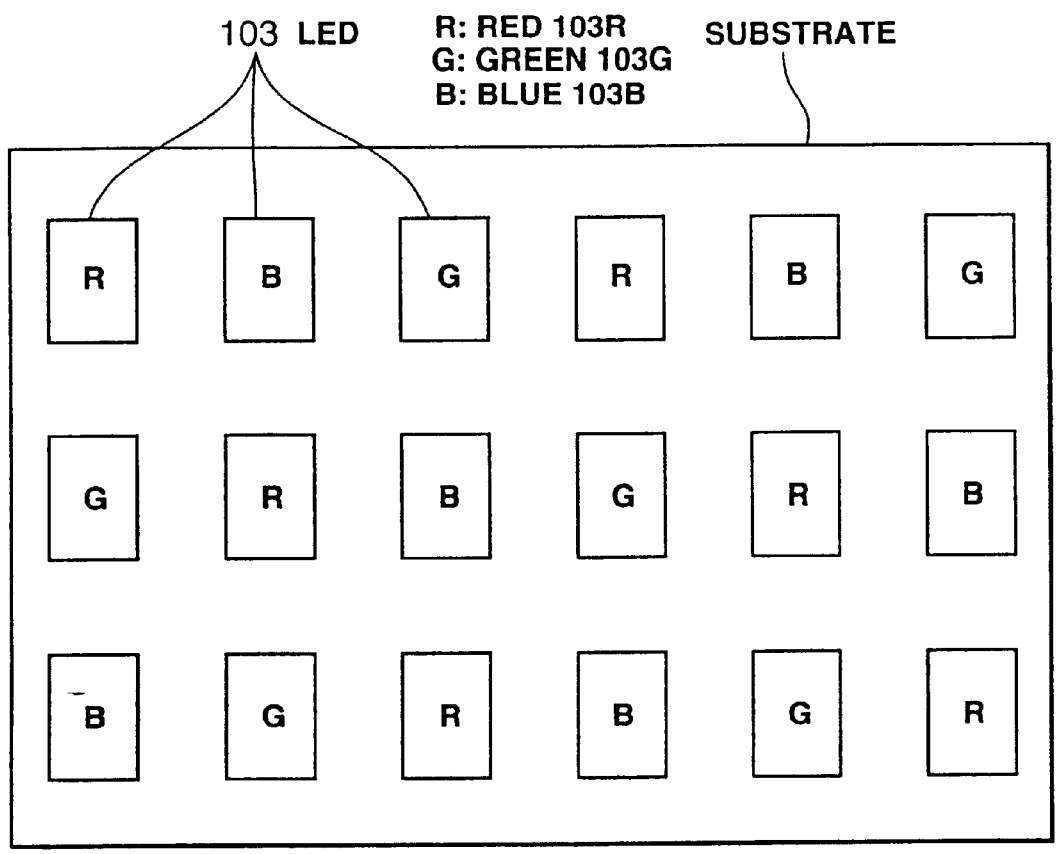
FIG. 13 is a plan view of a light source unit according to embodiment 5.

The LEDs 103R, 103G, and 103B are arranged in two dimensions within a plane, forming a 3×6 matrix on a substrate 109, as shown in FIG. 13. The intervals between the horizontal and vertical rows of the LEDs are 2.5 mm and 2 mm, respectively. The colors may also be arranged alternately in relation to each other. These arrangements are not limiting, however.

Although the present embodiment (embodiment 5) is described with reference to the use of LEDs corresponding to the three primary colors, it is possible to use LEDs that emit orange light instead of red light, and yellow-green light instead of green light, as long as color image generation is not compromised.

In embodiment 5, white light should preferably be used as the light source color because the pixels of the liquid-crystal display element have color filters. It is common practice, therefore, for all of the LEDs 103 on the substrate 109 to be lighted up at the same time, making it possible to mix colors and to produce white light by passing the light through the light guide body 102.

In the present embodiment, the light source has higher density and more-intense planar light is obtained because LEDs that emit red, blue, and green light and that are smaller in terms of external dimensions than white LEDs are arranged in a planar configuration (specifically, in two dimensions) in the manner described above.

An alternative is to separate the aforementioned LEDs 103R, 103G, and 103B and to light up each color sequentially at extremely short time intervals. This approach utilizes the presence of an after image in the human eye and is based on the interlacing of TV images. Such sequential lighting can reduce unit power consumption and bring about a proportional increase in the service life of batteries or the like.

Modification

Figure 14:
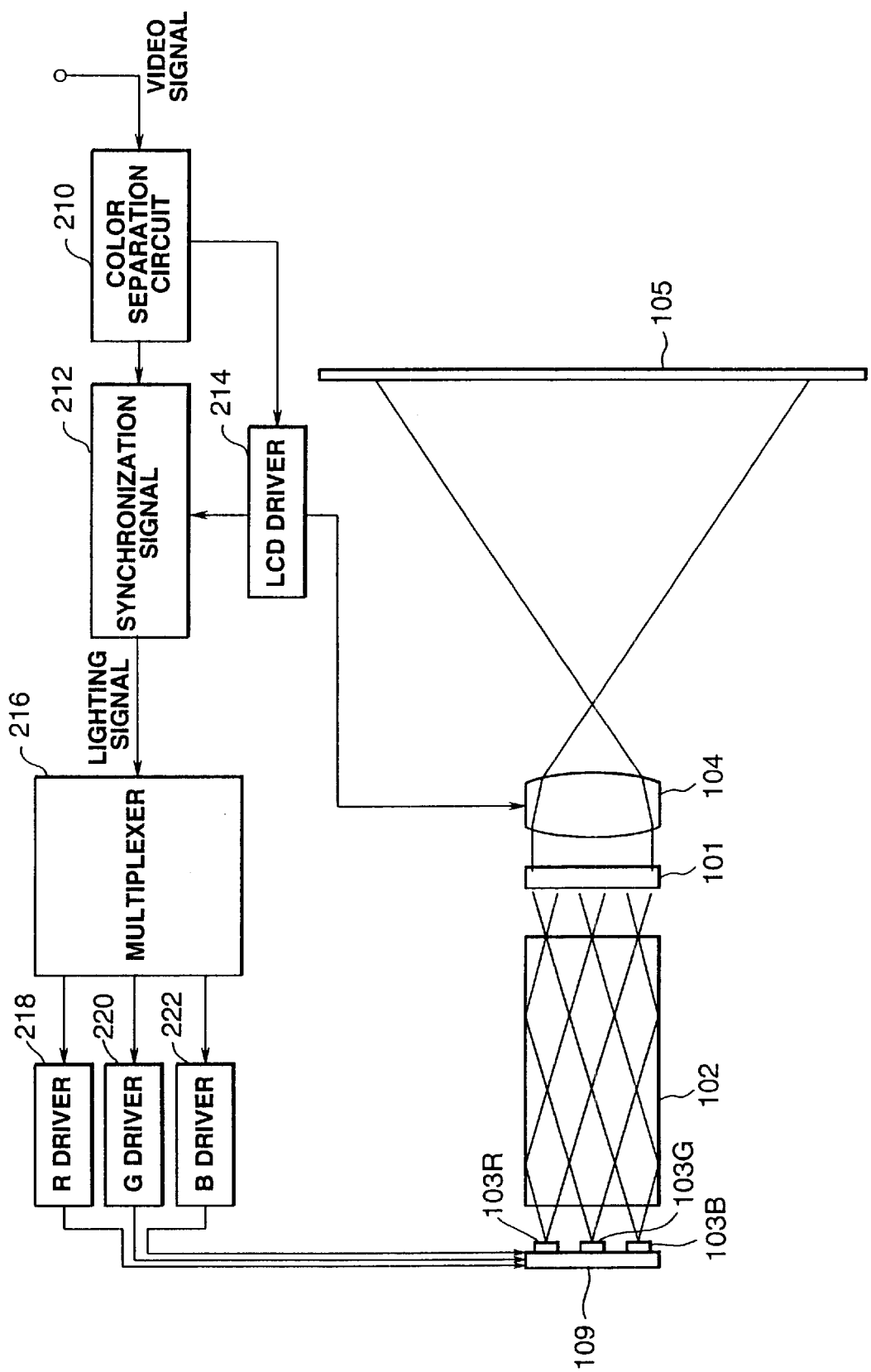
FIG. 14 is a top view and a circuit diagram of the main optical system for the light source device and projection-type liquid-crystal display device in a modified example of embodiment 5.

FIG. 14 depicts a modification of the color image display device in which seqential lighting is used.

In the pixels of the liquid-crystal display element 101 used in this modification, images of each color are formed and color images displayed in synchronism with the sequential lighting of the LEDs 103R, 103G and 103B without the use of color filters.

Specifically, an image signal is input to a color separation circuit 210 and is separated into different color signals. The color signals chromatically separated as such color separation signals are fed to a synchronization circuit 212 and an LCD driver 214. The LCD driver 214 controls the liquid-crystal display element 101 and forms images on the basis of the input color signals.

Meanwhile, the synchronization circuit 212 synchronizes the result with a color signal corresponding to the image displayed by the LCD driver 214, and feeds the result to a multiplexer 216. The multiplexer 216 sequentially selects an R driver 218, a G driver 220, and a B driver 222 and feeds the corresponding lighting signals. As a result, the LEDs 103R, 103G, and 103B display colors that correspond to those of the liquid-crystal display element 101. The image displayed on the screen 105 is one resulting from the mixing of three colors due to the after image effect, as described above.

The above-described structure allows image resolution to be increased threefold in comparison with that of a color-filtered liquid-crystal display element because each color image can be displayed using all the pixels on the liquid-crystal display element 101.

A reflection-type liquid-crystal display element that reflects light from a light source may be used in addition to the transmission-type liquid-crystal display element. Examples of devices that can be used as light modulation members or means also include light valves on which pixels are formed by deformable mirrors, and light modulation devices based on the reflection of light from outside sources (light sources) such as spatial modulation elements.

The present invention entails using a light guide structure in which light can be guided without any loss to the region to be illuminated (for example, the display area of a liquid-crystal display element) using a plurality of light-emitting diodes or other point light sources used for illumination purposes, and can thus provide a light source, projection-type liquid-crystal display device, or other optical device used for display purposes that is compact, lightweight, and inexpensive and that is capable of displaying projected images of uniform light intensity.

Another merit is that the intensity distribution can be rendered uniform as a result of the fact that light emitted by a plurality of two-dimensionally arranged light-emitting elements is transmitted by light guide means, making it possible, for example, to obtain a compact light source device capable of providing uniform illumination for a liquid-crystal display device or other optical modulation element or device.

Yet another merit is that light can be emitted by means of batteries, and further miniaturization can be achieved when LEDs are used as light-emitting elements.

What is claimed is:

1. A light source device, comprising:
  light guide means that is provided with mutually opposite end faces and that has a light guide function whereby light entering through one end face is guided to and emitted from the other end face; and
  a point light source array that is a separate entity from said light guide means and that is obtained by arranging a plurality of point light sources arranged along two directions in a planar configuration along one of the end faces of the light guide means,
  wherein an air layer is interposed between said point light source array and the light-entering end face of said light guide means.

2. A light source device as defined in claim 1, wherein the external shape of the end face for receiving light from said point light source array in said light guide means is substantially the same as the external shape of the end face for emitting the light.

3. A light source device as defined in claim 1, wherein said point light sources are light-emitting elements for emitting monochromatic light.

4. A light source device as defined in claim 1, wherein said point light source array is a combination of light-emitting elements of various colors.

5. A light source device as defined in claim 1, wherein substantially the same shapes are used for the external shape of the end face for emitting light in said light guide means, and the external shape of the illuminated surface of the illumination object illuminated with said emitted light.

6. A light source device as defined in claim 1, wherein said point light sources are light-emitting diodes.

7. An optical device, comprising:
a light source device as defined in claim 1; and
a member located opposite the end face for emitting the light of said light guide means and designed to modulate the light from said light guide means.

8. An optical device as defined in claim 7, wherein the external surface area of the end face for emitting light in said light guide means is substantially the same as the external surface area of the illuminated surface of the member for modulating the light from said light guide means.

9. A light source device, comprising the following separate entities:
a point light source array arranging a plurality of point light sources arranged along two directions in a planar configuration; and
light guide means in which light from the point light source array is admitted through at least one end, mixed, guided to the other end face, and emitted,
wherein an air layer is interposed between said point light source array and the light-receiving end face of said light guide means.

10. A light source device, comprising:
light guide means that is provided with mutually opposite end faces and that has a light guide function whereby light entering through one end face is guided to and emitted from the other end face; and
a point light source array that is a separate entity from said light guide means and that is obtained by arranging a plurality of point light sources in a planar configuration along one of the end faces of the light guide means,
wherein said light guide means comprises a hollow light guide body made of a transparent material,
wherein a reflecting metal surface is used as the surface of at least one end face inside the light guide means other than the end face for receiving light from said point light source array or the end face for emitting light in said hollow light guide body.

11. A light source device as defined in claim 10, wherein said reflecting surface comprises a curved surface.

12. A light source device, comprising:
light guide means that is provided with mutually opposite end faces and that has a light guide function whereby light entering through one end face is guided to and emitted from the other end face; and
a point light source array that is a separate entity from said light guide means and that is obtained by arranging a plurality of point light sources in a planar configuration along one of the end faces of the light guide means,
wherein said light guide means comprises a solid light guide body made of a transparent material,
wherein the surface of at least one side face of the light guide means other than the end face for receiving light from said point light source array or the end face for emitting light in said solid light guide body is a reflecting metal surface or a total reflection surface with respect to the light guided into the light guide means.

13. A light source device as defined in claim 12, wherein said reflecting surface comprises a curved surface.

14. A light source device, comprising:
light guide means that is provided with mutually opposite end faces and that has a light guide function whereby light entering through one end face is guided to and emitted from the other end face; and
a point light source array that is a separate entity from said light guide means and that is obtained by arranging a plurality of point light sources in a planar configuration along one of the end faces of the light guide means,
wherein said light guide means comprises a hollow light guide body or solid light guide body made of a transparent material,
wherein said reflecting surface comprises a plurality of flat reflecting surfaces, and said light guide body has a polygonal prismatic shape.

15. A light source device, comprising:
light guide means that is provided with mutually opposite end faces and that has a light guide function whereby light entering through one end face is guided to and emitted form the other end face; and
a point light source array that is a separate entity from said light guide means and that is obtained by arranging a plurality of point light sources in a planar configuration along one of the end faces of the light guide means,
wherein said light source device is so configured as to satisfy the relation $L \geq P/(\tan \theta)$, where L is the distance from the light-receiving side to the light-emitting side in the light guide means, P is the interval between adjacent point light sources in the point light source array, and $\theta$ is the angle with the optical axis at a position in which the intensity of light radiated by a point light source is ½ the intensity of said light along the optical axis.

16. A liquid-crystal display device, comprising:
a light source device including:
(a) light guide means that is provided with mutually opposite end faces and that has a light guide function whereby light entering through one end face is guided to and emitted from the other end face; and
(b) a point light source array that is a separate entity from said light guide means and that is obtained by arranging a plurality of point light sources in a planar configuration along one of the end faces of the light guide means; and
a liquid-crystal display element located opposite the end face for emitting the light of said light guide means and designed to modulate the light emitted by said light guide means.

17. A liquid-crystal display device as defined in claim 16, further comprising a magnifying lens disposed in the optical path of the emitted light optically modulated by said liquid-crystal display element.

18. A liquid-crystal display device as defined in claim 17, further comprising a screen configured such that the image of said liquid-crystal display element can be projected by said magnifying lens.

19. A liquid-crystal display device as defined in claim 16, wherein the external surface area of the end face for emitting light in said light guide means is substantially the same as the external surface area of the display surface of said liquid-crystal display element.

20. A light source device, comprising:
a light guide block as a light guide means provided with an inner wall capable of reflecting light, and shaped as a hollow component to form a light guide; and a point light source array composed of a plurality of point light sources that are capable of emitting light into said light guide and that are arranged along two directions in a planar configuration opposite one end face of the light guide block, wherein an air layer is interposed between said point light source array and the light-entering end face of said light guide means.

21. A light source device as defined in claim 20, wherein said light guide block has a cylindrical shape in which said inner walls are composed of curved surfaces.

22. A light source device as defined in claim 20, wherein said point light sources are light-emitting diodes.

23. An optical device, comprising:

a light source device as defined in claim 20; and a member located opposite the end face for emitting the light of said light guide block and designed to modulate the light from said light guide block.

24. An optical device as defined in claim 23, wherein the external surface area of the end face for emitting light in said light guide block is substantially the same as the external surface area of the illuminated surface of the member for modulating the light from said light guide block.

25. A light source device, comprising:

a light guide block as a light guide means provided with an inner wall capable of reflecting light, and shaped as a hollow component to form a light guide; and a point light source array composed of a plurality of point light sources that are capable of emitting light into said light guide and that are arranged in a planar configuration opposite one end face of the light guide block, wherein said light guide block has a polygonal prismatic shape in which said inner walls are composed of a plurality of flat reflecting surfaces.

26. A light source device, comprising:

a light guide block as a light guide means provided with an inner wall capable of reflecting light, and shaped as a hollow component to form a light guide; and a point light source array composed of a plurality of point light sources that are capable of emitting light into said light guide and that are arranged in a planar configuration opposite one end face of the light guide block, wherein said light guide block has a quadrangular prismatic shape comprising an end face on the side where said point light source array is disposed, an end face for emitting light opposite the end face where said point light source array is disposed, and four lateral surfaces corresponding to light-reflecting inner walls.

27. A liquid-crystal display device, comprising a light source device comprising:

(a) a light guide block as a light guide means provided with an inner wall capable of reflecting light, and shaped as a hollow component to form a light guide; and (b) a point light source array composed of a plurality of point light sources that are capable of emitting light into said light guide and that are arranged in a planar configuration opposite one end face of the light guide block; and a liquid-crystal display element located opposite the end face for emitting the light of said light guide block and configured to allow the light emitted by the light guide block to be modulated, wherein images can be viewed directly from the light emission side of the liquid-crystal display element.

28. A liquid-crystal display device, comprising a light source device comprising:

(a) a light guide block as a light guide means provided with an inner wall capable of reflecting light, and shaped as a hollow component to form a light guide; and (b) a point light source array composed of a plurality of point light sources that are capable of emitting light into said light guide and that are arranged in a planar configuration opposite one end face of the light guide block;

a liquid-crystal display element disposed facing the other end face of said light guide block and configured such that light emitted by the light guide block can be modulated; and a magnifying lens disposed in the optical path of the emitted light optically modulated by said liquid-crystal display element.

29. A liquid-crystal display device as defined in claim 28, further comprising a screen configured such that the image on said liquid-crystal display element can be projected by said magnifying lens.

30. A liquid-crystal display device, comprising:

a plurality of light source devices comprising:

(a) light guide means that is provided with mutually opposite end faces and that has a light guide function whereby light entering through one end face is guided to and emitted from the other end face; and (b) a point light source array that is a separate entity from said light guide means and that is obtained by arranging a plurality of point light sources in a planar configuration along one of the end faces of the light guide means, wherein said light source devices are so configured as to emit light within the wavelength region of each primary color, color synthesis means which comprise, in accordance with each primary color, prescribed color modulation units comprising said light source devices and liquid-crystal display elements that are disposed facing the end face through which light is emitted by said light guide means and that are configured such that light emitted by said light guide can be modulated, and in which light emitted by the prescribed color modulation units can be synthesized; and a projection lens disposed in the optical path of the emitted light synthesized by the color synthesis means.

31. A liquid-crystal display device as defined in claim 30, wherein said color synthesis means is a dichroic prism.

32. A liquid-crystal display device, comprising:

a light source device as defined in claim 31; and a liquid-crystal display element located opposite the end face for emitting the light of said light guide means and designed to modulate light from the light guide body.

33. A liquid-crystal display device as defined in claim 32, comprising a projection lens located on the opposite side from the light guide body with respect to said liquid-crystal display element.

34. A liquid-crystal display device, comprising:

a plurality of light source devices comprising:

(a) light guide means that is provided with mutually opposite end faces and that has a light guide function whereby light entering through one end face is guided to and emitted from the other end face; and (b) a point light source array that is a separate entity from said light guide means and that is obtained by arranging a plurality of point light sources in a planar configuration along one of the end faces of the light guide means, wherein said light source devices emit white light, color synthesis means which comprise, in accordance with each primary color, prescribed color modulation units comprising said light source devices, liquid-crystal display elements that are disposed facing the end face through which light is emitted by said light guide means and that are designed to modulate the light emitted by said light guide, and filters so configured as to be able to transmit light within the wavelength region of each primary color, and in which light emitted by the prescribed color modulation units can be synthesized; and a projection lens disposed in the optical path of the emitted light synthesized by the color synthesis means.

35. A light source device, comprising:

a point light source array obtained by forming a planar configuration from a plurality of light-emitting elements for emitting light of the three primary colors; and a light guide body which is a separate entity from said point light source array and in which light from said point light source array is admitted through one end face and is guided to the other end face wherein an air layer is interposed between said point light source array and said light guide means.

36. A light source device as defined in claim 35, comprising a circuit for simultaneously or sequentially lighting up the light-emitting elements for emitting each color.

37. A light source device as defined in claim 35, wherein said light-emitting elements are light-emitting diodes.

38. An optical device, comprising:

a light source device as defined in claim 35; and a member located opposite the end face for emitting the light of said light guide means and designed to modulate the light from said light guide means.

39. A light source device, comprising:

a point light source array obtained by forming a planar configuration from a plurality of light-emitting elements arranged along two directions for emitting monochromatic light; and a light guide body in which light from the point light source array is admitted through one end face and is guided to the other end face; further comprising a luminescent film located opposite the light-receiving surface or light-emitting surface of the light guide body and designed to convert said monochromatic light to white light, wherein an air layer is interposed between said point light source array and said light guide means.

40. A light source device, comprising:

a point light source array obtained by forming a planar configuration from a plurality of light-emitting elements for emitting light of the three primary colors; and a light guide body which is a separate entity from said point light source array and in which light from said point light source array is admitted through one end face and is guided to the other end face, wherein said light guide body is hollow, and a reflecting metal surface is used as the surface of at least one end face inside said light guide body other than the end face for receiving light from said point light source array or the end face for emitting light.

41. A light source device, comprising:

a point light source array obtained by forming a planar configuration from a plurality of light-emitting elements for emitting light of the three primary colors; and a light guide body which is a separate entity from said point light source array and in which light from said point light source array is admitted through one end face and is guided to the other end face, wherein said light guide body is solid, and the surface of at least on side face of said light guide body other than the end face for receiving light from said point light source array or the end face for emitting light is a reflecting metal surface or a total reflection surface with respect to the light guided into said light guide body.

42. A light source device, comprising:

a point light source array obtained by forming a planar configuration from a plurality of light-emitting elements for emitting light of the three primary colors; and a light guide body which is a separate entity from said point light source array and in which light from said point light source array is admitted through one end face and is guided to the other end face, wherein said light source device is so configured as to satisfy the relation $L \geq P/(\tan \theta)$, where L is the distance from the light-receiving side to the light-emitting side in the light guide means, P is the interval between adjacent point light sources in the point light source array, and $\theta$ is the angle with the optical axis at a position in which the intensity of light radiated by each light-emitting element is ½ the intensity of said light along the optical axis.

43. An optical device as defined in claim 42, wherein the external surface area of the end face for emitting light in said light guide means is substantially the same as the external surface area of the illuminated surface of the member for modulating the light from said light guide means.

44. A liquid-crystal display device, comprising:

a light source device comprising a point light source-array obtained by forming a planar configuration from a plurality of light-emitting elements for emitting light of the three primary colors, and a light guide body in which light from the point light source array is admitted through one end face and is guided to the other end face; and a liquid-crystal display element located opposite the end face for emitting the light of said light guide body, said liquid-crystal display element modulating the light of each color and forming an image on the basis of image signals separated into individual colors in synchronism with the sequential lighting of said light-emitting elements of each color.

* * * * *